United States Patent [19]

Ayres et al.

[11] Patent Number: 4,783,253

[45] Date of Patent: Nov. 8, 1988

[54] PROCESS FOR SEPARATING RADIOACTIVE AND HAZARDOUS METAL CONTAMINANTS FROM SOILS

[76] Inventors: James W. Ayres, 5633 W. Palmyra; Alfred W. Western, 6470 W. Desert Inn Rd., both of Las Vegas, Nev. 89102

[21] Appl. No.: 853,995

[22] Filed: Apr. 21, 1986

[51] Int. Cl.[4] .......................... B07C 5/34; B03B 5/16
[52] U.S. Cl. ...................... 209/2; 209/44.1; 209/455; 209/557; 209/576; 250/255
[58] Field of Search .............. 209/555, 557, 571, 576, 209/589, 44.1, 12, 455, 456, 457, 461, 462, 2; 250/255, 359.1

[56] References Cited

U.S. PATENT DOCUMENTS

| | | | |
|---|---|---|---|
| 826,178 | 7/1906 | Marrs | 209/455 |
| 1,728,196 | 9/1929 | Blatch | 209/457 |
| 2,963,155 | 12/1960 | Peterson | 209/457 |
| 3,053,388 | 9/1962 | Tittle | 209/589 |
| 4,128,474 | 12/1978 | Ennis | 209/2 |
| 4,231,478 | 11/1980 | Stone | 209/576 |
| 4,646,978 | 3/1987 | Johnson et al. | 209/589 |

FOREIGN PATENT DOCUMENTS 1184293 12/1964 Fed. Rep. of Germany .......... 209/1

*Primary Examiner*—Robert B. Reeves
*Assistant Examiner*—Donald T. Hajec
*Attorney, Agent, or Firm*—Jerry R. Seiler

[57] ABSTRACT

A process for treating radioactive contaminated soils to remove radioactive metal oxide contaminants therefrom comprises creating a suspension of particles of the soil in a column of water, alternately forcing fresh water in the column upwardly to force ligher soil particles upwardly in the column and allowing heavier particles to gravitationally settle in the bottom of the water column. The heavy particles comprising radioactive metal oxides are collected and handled for radioactive waste material storage. The aqueous slurry of lighter soil particles is directed to a separator for removing substantial amounts of water after which the particles are directed to a conveyor and spread out to a substantially uniform thickness and detected for any radioactivity. Portions of material in which radioactive particles are detected ar diverted and the uncontaminated soil material is recovered.

10 Claims, 2 Drawing Sheets

PROCESS FOR SEPARATING RADIOACTIVE AND HAZARDOUS METAL CONTAMINANTS FROM SOILS

BACKGROUND OF THE INVENTION

A rather large amount of radioactive soil material has accumulated in areas where nuclear device testing has been carried out over the years. Of special significance is the amount of radioactive soil on a number of South Pacific Islands, the radioactivity being generally present in coral soils, often referred to as transuranic material, containing usually radioactive plutonium and/or americium. Other nuclear testing areas also contain significant amounts of these and similar radioactive materials in the soil. Because of the great volume of such radioactive soils, handling, transportation and storage problems and costs are substantial. In other locations large amounts of soils containing hazardous metals such as lead, mercury, silver, arsenic, cadmium and chromium often result in unusable land masses of such great volumes that the cost of disposal is economically impractical, if not prohibitive.

SUMMARY OF THE INVENTION

It has been found, according to the present invention, that the hazardous or radioactive components of contaminated soils can be removed by creating a suspension of the soil particles in a column of water, alternately forcing water in the column upwardly to float away the lighter uncontaminated particles while allowing the heavier contaminated particles to settle to the bottom of the water column. The portion of the soil containing the lighter and generally uncontaminated material is then inspected by radioactive detection means and remaining contaminated soil portions are separated and the uncontaminated soil is recovered.

DETAILED DESCRIPTION OF THE INVENTION

Figure 1:
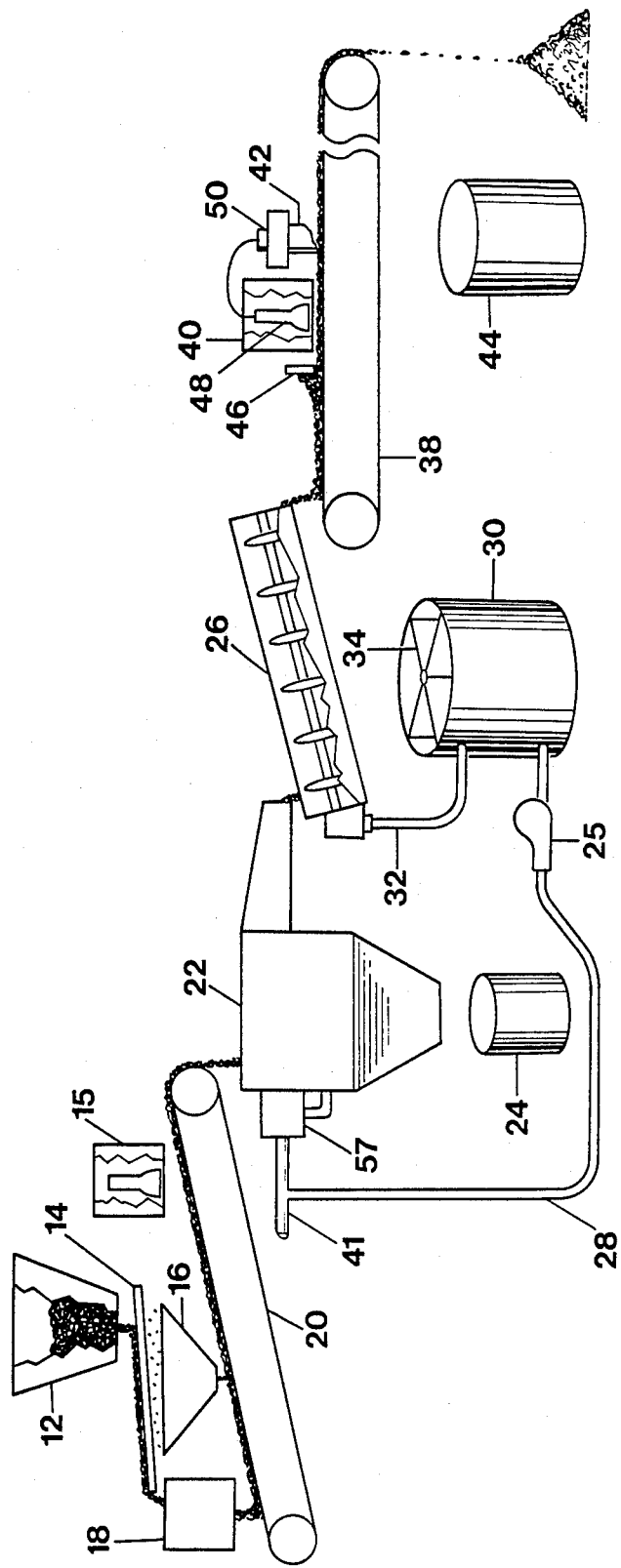
FIG. 1 is a schematic drawing illustrating components used in carrying out the process of the invention.

In treating soils according to the process of the invention, an apparatus shown generally in FIG. 1 is useful. The radioactive materials are usually present as metal oxides, whereas the aforesaid hazardous metals may be free metals or present as compounds of the metals. Soil containing the contaminants is placed in a hopper 12 or similar chute using a loader or other convenient means. The material is directed to a sizing apparatus such as a vibrating screen 14 which separates smaller particles from larger particles, the latter passing to a crusher 18. Any other means for separating out particles too large to be conveniently handled in the subsequent process may be used, and that shown is by way of illustration only. The sizing apparatus conveniently passes soil particles of 4 mm while larger particles or "overs" are directed to the crusher 18 for crushing the particles to a nominal size not larger than about 4 mm diameter. Conveyer 20 then moves the material to an apparatus for gravitationally separating heavier and lighter particles. Optionally, at a convenient location, prior to being introduced into the separation phase of the system, radioactively contaminated soil may be inspected with a radiation detector to provide an indication of the level of contamination. Such detection may also be useful in rating the effectiveness of the process by comparing the radioactive level obtained subsequently in the process. For this purpose detector 15 is shown above conveyor 20, although such detection equipment may be placed at any location upstream of jig 22.

Figure 2:
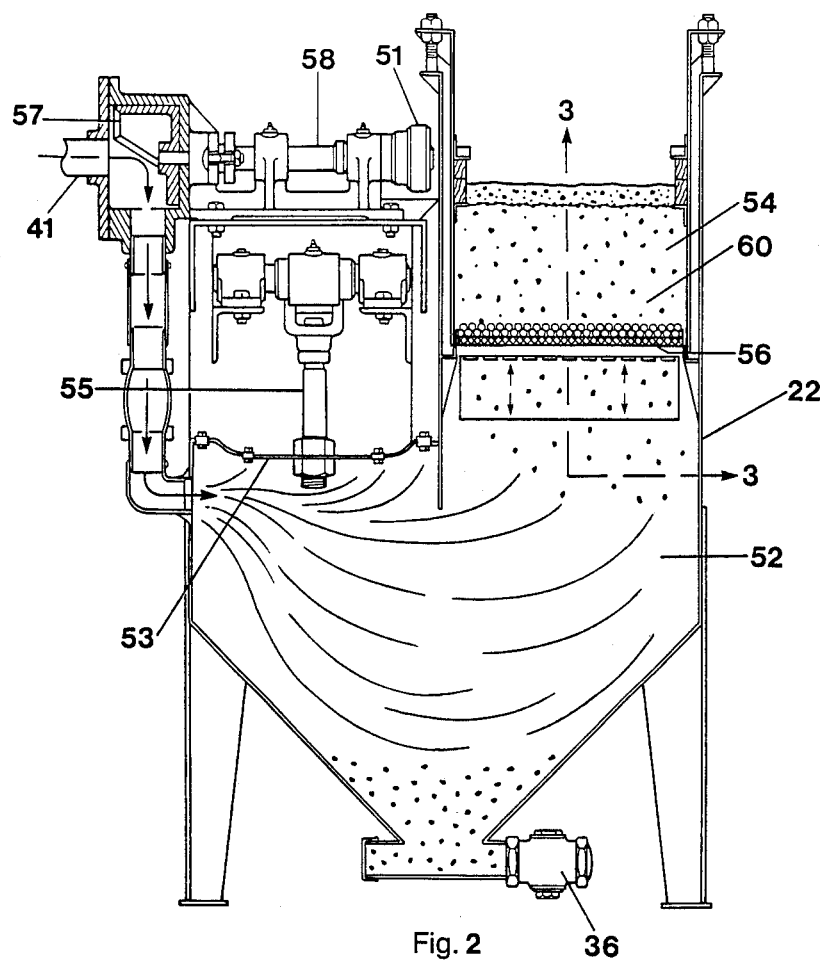
FIG. 2 is a sectional elevation of a mineral jig apparatus conveniently used in the process.

In FIG. 1, a gravitational separator in the form of a mineral jig 22 is used for creating a slurry or suspension of soil particles in a column of water and separating heavier particles from lighter particles. This separation is further explained by reference to FIGS. 2 and 3 which describe the apparatus in more detail. In FIG. 2 the mineral jig apparatus is shown in which soil particles 60 are suspended in a column of water in screen compartment 54. The column of water is subjected to alternate upward force of water created by a reciprocating diaphragm 53 and rotating water valve 57 which alternately feeds fresh water via pipe 41 to hutch 52. A motor (not shown) drives pulley 51 and rotates drive shaft 58 for alternately opening and closing water valve 57. Thus, fresh water is alternately pumped into the hutch 52 which creates the alternate upward movement of water in the water column present in screen compartment 54. Rod 55 is simultaneously driven reciprocally causing reciprocal movement of diaphragm 53. In the position shown in FIG. 2, fresh water is entering the hutch via inlet pipe 41 and through valve 57 while the downward stroke of diaphragm 53 forces water in the water column in screen compartment 54 to rise. In the alternate position (not shown), valve 57 is closed while diaphragm 53 is in an upward or elevated position. In this condition, the heavier particles settle to the bottom of the column through bar screen 56 and pass into the bottom of hutch 52 for collection and removal.

Figure 3:
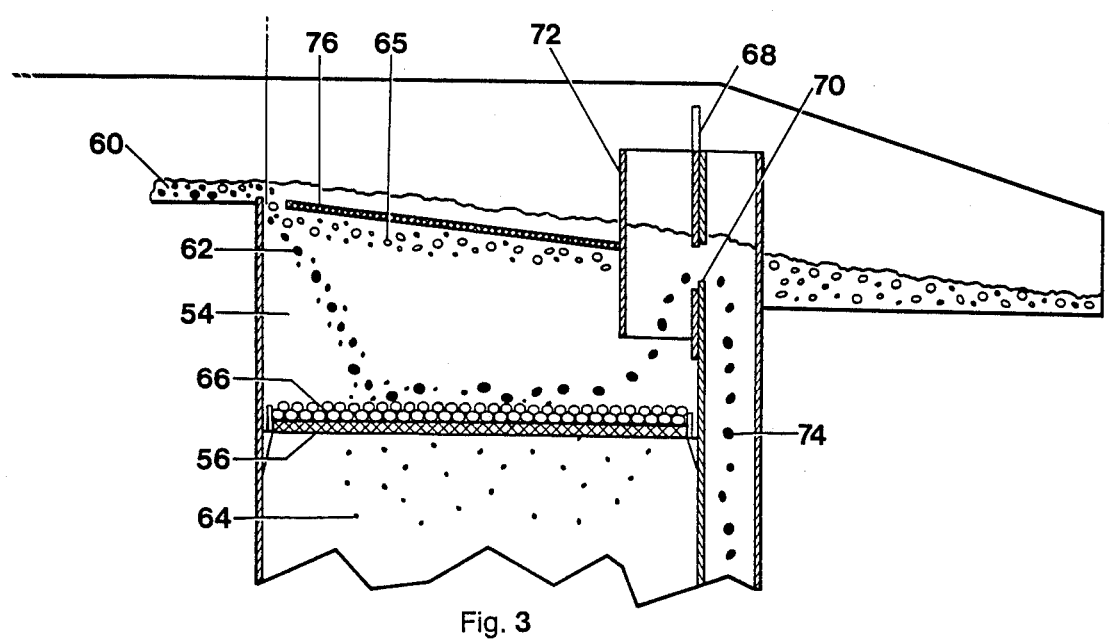
FIG. 3 is a sectional view illustrating a portion of the apparatus of FIG. 2 taken along lines 3—3 thereof.

Observing also FIG. 3, as the mixture of solid light and heavy particles 60 passes into screen compartment 54, large and small heavier particles 62 and 64 fall gravitationally through the water column to the bottom of screen compartment 54 while lighter particles 65 float near the top of the water in the compartment. A trash screen 76, may be present to filter off or direct any floating materials at the top of the water column and prevent them from otherwise accumulating in the screen compartment. As the water moves from left to right in FIG. 3, smaller heavier contaminated particles filter through bedding material 66 which may be of any desired thickness and selected opening sizes. These contaminated particles then pass through screen 56 which supports the bedding material 66. The larger heavier particles 62 are forced along with the moving water stream beneath diverter 72 and through port 70 into draw-off pipe 74.

The heavier sinking particles small enough to pass through the bedding material 66 will be collected at the narrow base of hutch 52 while the larger heavier particles 62 drawn off through port 70 and pipe 74 are collected in a radioactive waste container. The smaller particles may be drawn off through a discharge fitting 36 at the bottom of hutch 52 as desired. The apparatus may be provided with handle means 68 for raising or lowering a diverter 72 for occluding and/or opening port 70 as desired.

The soil radioactive contaminants are normally heavy metal oxides occurring as tiny little spheres, or are attached to fragments of metal, usually steel and the like. Radioactive metal oxides mostly consist of plutonium oxide having a specific gravity of 11.46 or americium oxide, having a specific gravity of 11.68. Iron, the principal element of steel has a specific gravity of 7.86. On the other hand, uncontaminated soil components have substantially lower specific gravities. For example, pure calcium carbonate has a specific gravity ranging between about 2.7 and about 2.9 while silica, another major soil ingredient has specific gravities ranging from about 2.2 to about 2.6. Coral samples which have a relatively high porosity have specific gravities ranging between about 1.5 and about 2.0. It is because of these significant differences in specific gravities of radioactive contaminated materials and uncontaminated soil particles that provides for separation according to the process of the invention. Generally, for successful separation, the radioactive contaminants must have a specific gravity of at least about twice that of the uncontaminated particles.

The lighter soil particles in the slurry or suspension float in the water column and are directed into an apparatus 26 for separating substantial amounts of water from the mixture. Preferably at least about 70% of the water is removed from the suspension in this step of the process. Suitable water separating apparatus may include centrifuges, filters or other equivalent devices. A particularly useful apparatus is a spiral classifier as shown in FIG. 1 which allows for continuous removal of the water as the process is carried out. A hose 32 directs water and any remaining suspended soil particles from the classifier to a tank 30. A stirrer 34 agitates the aqueous mixture while a pump 25 directs the material back into mineral jig 22 via pipe 28 and valve 57. This return provides further separation of light or heavy particles that may have inadvertently passed through the system.

Once the material has passed through classifier 26, there will still be normally about 12-20% of water present although the material can be handled substantially as a particulate solid. It is then directed onto conveyer 38 where a gate or bar 46 is maintained at a predetermined elevation above the conveyer and spreads the solid material to a substantially uniform thickness for being exposed to radioactive detection means. Preferably the thickness of the layer of material spread by the gate is no greater than about 4 inches.

Any radioactive contaminants remaining in the soil material are detected on conveyer 38 by scintillation detectors as the soil is passed along on the conveyer belt. As shown in FIG. 1, a detector housing 40 is provided with radiation detectors 48. Preferably a plurality of such devices are stationed side-by-side so that the detection field extends entirely across the space in which the layer of soil travels on the conveyer belt. Suitable detectors are preferably low energy radiation probes operating in an energy range of between about 13 and about 24 Kev. These detectors will continually scan the moving layer of soil passing beneath the detector housing and will detect any radioactive decontaminants present. As the soil layer continually passes beneath the detectors 48, when radioactive material is detected, a signal is passed to a controller 50 which will operate a suitable drive mechanism for lowering knife gate 42. When the knife gate is lowered, it passes through the layer of soil on the conveyer belt and deflects the soil off of the belt into a suitable container 44 for radioactive material. Of course, any kind of container may be used for receiving the radioactive material as may any other equivalent or suitable means for removing detected radioactive soil material from the conveyer belt and for directing it to such a suitable container. Although an automatic knife gate means as shown in the drawing may be used for directing contaminated soil from the conveyer belt once radiation contamination is detected, this may also be done manually, for example, with the radioactive detector being connected to an alarm. Once the alarm is given, an operator may drop a knife blade or other means for directing the radioactive contaminated soil portion off the conveyer belt to a suitable collection or storage container. Any other suitable means for removing the soil from the conveyor may be substituted for the knife gate.

After radioactive material is no longer sensed by detector 48, knife blade 42 may again be raised and the clean soil material passed on to the end of conveyer 38 where it may be suitably recovered. The recovered clean soil material may be treated further for detecting any remaining residual radioactivity that may have passed undetected. For example, the material may be taken to a suitable area and laid down to a uniform thickness and inspected further with a radioactive detection means. Once radioactivity is no longer detected, the soil material may be used in an unrestricted manner. Moreover, the contaminated soil recovered in containers 24 and 44 may be further treated or processed to concentrate the heavy metal contaminants. For example, the contaminated material may be subjected to an electrostatic field in which lighter particles are deflected more than heavier uncontaminated particles. Advantage may be taken of such deflection differences in separating the materials. Alternatively, the radioactive components may be preferentially dissolved by selective solvent means and the solution subjected to chemical or electrochemical precipitation or deposition. Other components for accomplishing the process steps described above may be used or substituted as may additional treatment steps, all within the purview of the invention.

Although the process of the invention has been particularly described for use in separating radioactive materials, it may be used to separate hazardous metals or metal compounds. The only substantial difference in treating the hazardous metal soils is that the radioactive detection steps and equipment are eliminated. Instead, the soil composition recovered from the classifier is tested by chemical and/or physical analysis to determine that it meets or passes requirements and standards for safe materials.

We claim:

1. A process for treating soils for separating hazardous or radioactive metal contaminated particles from uncontaminated soil particles comprising the steps:
    (a) creating a suspension of particles of said soil in a column of water,
    (b) alternately forcing water upwardly into said water column from the bottom thereof thereby forcing lighter particles upwardly in said water column and allowing heavier particles to gravitationally settle to the bottom of said water column, said uncontaminated particles being generally lighter than said contaminated particles, whereby the heavier contaminated particles are collected with said heavier particles, (c) removing said heavier particles from the bottom of said water column and directing the suspension of lighter particles in said water column to means for separating water, (d) separating water from said suspension to form a particulate solid soil composition comprising said lighter particles, and (e) further separating portions of said particulate solid soil composition containing hazardous or radioactive soil particles from portions of said particulate solid soil composition free from contamination, and recovering said portions, respectively.

2. The process of claim 1 including a step of crushing soil to particles of a nominal size not larger than about 4 mm prior to creating said suspension.

3. The process of claim 1 wherein at least about 70% of the water is removed from said suspension in said step of separating water to form a wet solid particulate soil composition.

4. The process of claim 3 wherein said step of separating water from suspension is carried out in a spiral classifier.

5. The process of claim 3 wherein the wet particulate soil composition recovered from said classifier is directed to a conveyer and spread to a substantially uniform thickness prior to being exposed to said radioactive detection means.

6. The process of claim 5 wherein said substantially uniform thickness is no greater than about 4 inches.

7. The process of claim 1 wherein said water separated from said suspension is agitated and directed to said step (a).

8. The process of claim 1 wherein steps (b) and (c) are carried out in a mineral jig apparatus.

9. The process of claim 1 wherein said heavier particles have a specific gravity at least twice as great as said lighter particles.

10. The process of claim 1 wherein said metal contaminated particles comprise radioactive metal oxides and wherein said step (e) includes exposing the particulate solid soil composition to radioactive detection means.

* * * * *